April 28, 1925.

M. W. MORGAN

ROTARY SHAFT COUPLING

Filed May 29, 1923

1,535,621

INVENTOR
Merton W. Morgan

BY
John W. Harley
ATTORNEY

Patented Apr. 28, 1925.

1,535,621

UNITED STATES PATENT OFFICE.

MERTON W. MORGAN, OF BALTIMORE, MARYLAND, ASSIGNOR TO POOLE ENGINEERING AND MACHINE COMPANY, OF WOODBERRY, MARYLAND, A CORPORATION OF MARYLAND.

ROTARY-SHAFT COUPLING.

Application filed May 29, 1923. Serial No. 642,239.

*To all whom it may concern:*

Be it known that I, MERTON W. MORGAN, a citizen of the United States, residing at Baltimore, in the State of Maryland, have invented certain new and useful Improvements in Rotary-Shaft Couplings; and I do hereby declare the following to be a full, clear, and exact description of the invention, such as will enable others skilled in the art to which it appertains to make and use the same.

My invention relates to a coupling for rotary shafts.

Among the objects of my invention are:—

To provide a coupling so constructed and arranged that the outside members thereof may be used to align the shafts that are to be coupled.

To provide a coupling capable of providing a positive driving relation between a pair of shafts while permitting freedom of rotation of said shafts even though they are structurally or otherwise misaligned axially.

To provide a coupling having a lubricated bearing co-axial with each of the coupled shafts.

To provide a coupling in which there is a member for each shaft comprising teeth having curved crowns, and a sleeve having teeth engaging the teeth on said members, the surfaces between adjacent teeth on said sleeve bearing on said crowns in order to form bearings for the ends of said sleeve and combining with said sleeve dust guards having contact with said members.

To provide a coupling so constructed and arranged as to provide for axial movement of each shaft independently of the other shaft.

To provide a coupling having a large capacity per pound of metal employed.

These and further objects of my invention will become apparent in the following specification, reference being had to the accompanying drawings, and the novel means by which said objects are effectuated will be definitely pointed out in the claims.

In the drawings:—

Fig. 2 is a view looking in the direction of the arrow 2 in Fig. 1 of a detail hereinafter referred to.

In the drawings:—

Figure 1:
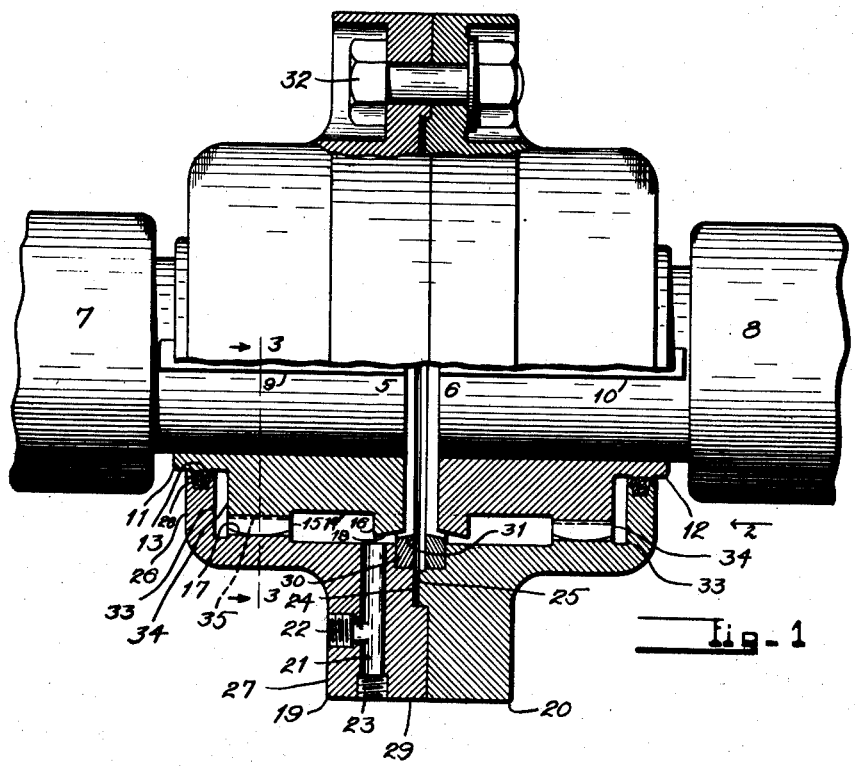
Figure 1 is a view partly in section of my improved coupling.
Figure 2:
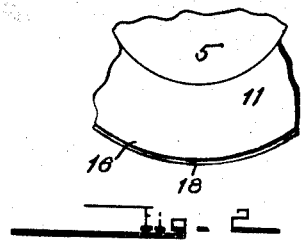

5 and 6 are the shafts that are coupled by my improved coupling. Either shaft may be the driver and each is revolubly mounted in bearings, one of which for each shaft is shown at 7 and 8, respectively.

Upon each shaft there is secured by the keys 9 and 10, respectively, the shaft members 11 and 12, respectively. The members 11 and 12 being similar, the member 11 only will be described in detail.

The member 11 is provided with the cylindrical surfaces 13 and 14 and with the teeth 15 and a flange 16. The teeth 15 have involute flanks and faces. Said flanks and faces may be of any curvature suitable for gear teeth, but in any case, the crowns of the teeth 15 are curved as shown at 17 for a purpose hereinafter explained.

The flange 16 is provided with a frustroconical surface 18 coaxial with the shaft 5 for a purpose hereinafter explained.

The members 11 and 12 are coupled together by a sleeve formed of the sleeve members 19 and 20. The members 19 and 20 being similar, excepting that the former has the oiling passage 21 which is closed by the removable plug 22 and the riveted plug 23 and a counter-bored recess 24 for the reception of the cylindrical projection 25 on the member 20, the member 19 only will be described in detail.

The member 19 is provided with the flanges 26 and 27. The flange 26 has an annular groove therein for the packing 28 and the latter forms a dust tight joint with the surface 13, which is sufficiently smaller in diameter than the pitch diameter of the teeth 15 to insure that the latter will have a supply of oil without danger of its finding egress past the packing 28.

The flange 27 has a cylindrical surface 29 and a ring 30 is secured in said flange. The ring 30 has an inner frustro-conical surface 31 of the same taper as the surface 18 and coaxial with the surface 29 for a purpose hereinafter explained.

Teeth 35 are formed on the interior of the member 19 which mesh with the teeth 15. The surfaces between adjacent teeth 35 bear upon the surfaces 17 in order to provide a bearing for the end of the sleeve member 19.

The members 19 and 20 are secured together by bolts, one of which is shown at 32.

The manner of assembling and the mode of operation of my improved coupling is as follows:—

The sleeve member 19 is placed upon the shaft member 11 by sliding it thereon from left to right and the ring 30 is then pressed in place.

The sleeve member 20 is similarly placed upon the shaft member 12.

The shaft members 11 and 12 are then secured upon the shafts 5 and 6, respectively, and the sleeve member 19 placed with the surface 31 in contact with the surface 18. The sleeve member 20 is similarly placed.

The shafts 5 and 6 are then adjusted until they are in axial alignment as will be evidenced by the conformity of the cylindrical surface 29 and the similar surface of the member 20 to a straight edge placed thereagainst, or by a wedge placed between the abutting surfaces of the flanges 19 and 20. The members 19 and 20 are then to be bolted together and oil introduced through the passage 21. When the members 19 and 20 are bolted together, one of the surfaces 33—33 will contact with one of the surfaces 34—34 before the surfaces 18 and 31 contact; hence limited end play of the sleeve is provided.

Figure 3:
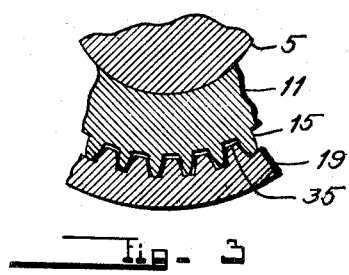
Fig. 3 is a section along the line 3—3 in Fig. 1 looking in the direction of the arrows.

Should the shafts 5 and 6 be misaligned the members 19 and 20 having a rocking bearing on the surfaces 17 will allow sufficient angular freedom to prevent said shafts from binding in their bearings. The teeth of said members have sufficient play between the teeth 15 to permit of said movement. This play is shown greatly exaggerated in Fig. 3.

It is to be noted that by having the rocking bearings for the sleeve members upon the surfaces 17, I am enabled to build a coupling of minimum diameter for any given capacity.

It is to be noted that by the use of the frustro-conical surfaces 18 and 31 I provide means for attaining great accuracy in the alignment of the shafts 5 and 6. Further, that but a small movement of the members 19 and 20 is required to bring said surfaces into contact; consequently, the bearings 7 and 8 need not be far from the members 11 and 12.

It is to be noted that the members 19 and 20 when bolted together have sufficient permissible movement axially to provide for all needful end play of the shafts 5 and 6.

I have shown one form of my invention for illustrative purposes but it is to be understood that changes may be made in the structure shown without departing from the spirit of my invention.

I claim:—

1. In a coupling, the combination with a pair of shaft members for attachment to the shafts to be coupled, each member comprising teeth having curved crowns, of a pair of sleeve members bolted together and having teeth engaging the teeth of said shaft members, the surfaces between the teeth on said sleeve bearing on said crowns, a frustro-conical surface on each shaft member, an outer cylindrical surface on each sleeve member and a frustro-conical surface on each of said sleeve members located to contact, when said sleeve members are unbolted and moved axially, with the frustro-conical surface on the corresponding shaft member in order to coaxially align said cylindrical surface with the corresponding shaft.

2. In a coupling, the combination with a pair of shaft members for attachment to the shafts to be coupled, each member comprising teeth having curved crowns, of a pair of sleeve members bolted together, each member having teeth engaging the teeth of said shaft members, the surfaces between the teeth on said sleeve bearing on said crowns, an outer cylindrical surface on each sleeve member, and means for coaxially aligning said cylindrical surface with the corresponding shaft when said sleeve members are unbolted and moved axially.

3. In a coupling, the combination with a pair of shaft members for attachment to the shafts to be coupled, each member comprising teeth having curved crowns, of a pair of sleeve members bolted together and having teeth engaging the teeth of said shaft members, the surfaces between the teeth on said sleeve bearing on said crowns, a frustro-conical surface on each shaft member, an outer cylindrical surface on each sleeve member and a ring secured in each of said sleeve members and comprising a frustro-conical surface located to contact, when said sleeve members are unbolted and moved axially, with the frustro-conical surface on the corresponding shaft member in order to coaxially align said cylindrical surface with the corresponding shaft.

In testimony whereof, I affix my signature.

MERTON W. MORGAN.